United States Patent [19]
Jirka et al.

[11] 3,934,599
[45] Jan. 27, 1976

[54] SUBMERGED MULTIPORT DIFFUSERS FOR COOLING WATER DISCHARGE

[75] Inventors: Gerhard H. Jirka, Belmont; Donald R. F. Harleman, Lexington, both of Mass.

[73] Assignee: Massachusetts Institute of Technology, Cambridge, Mass.

[22] Filed: May 10, 1974

[21] Appl. No.: 468,852

[52] U.S. Cl. .................................. 137/1; 137/236
[51] Int. Cl.² ................................................ C02C 1/00
[58] Field of Search .......... 239/10, 566; 137/1, 236; 61/.5; 210/200; 261/124

[56] References Cited
UNITED STATES PATENTS

| | | | |
|---|---|---|---|
| 1,214,372 | 1/1917 | Romberger | 261/124 |
| 3,490,485 | 1/1970 | Munson | 137/236 |
| 3,647,140 | 3/1972 | Perrot | 239/566 X |
| 3,677,936 | 7/1972 | Bastiaanse | 261/124 X |

*Primary Examiner*—Alan Cohan
*Attorney, Agent, or Firm*—Arthur A. Smith, Jr.; Robert Shaw; Martin M. Santa

[57] ABSTRACT

A multiport diffuser for discharging condenser cooling water from thermal power plants and the like, the diffuser being adapted for installation at the bottom of a large body of water and being operable to discharge the condenser cooling water at that submerged location. The diffuser consists of a main pipe disposed along the bottom of the large body of water and a large number of nozzles oriented at predetermined variable angles to the axis of the main pipe, the angle of orientation being a function of the distance of a particular nozzle away from the longitudinal center of the main pipe and also a function of the half-length of the main pipe.

5 Claims, 13 Drawing Figures

SUBMERGED MULTIPORT DIFFUSERS FOR COOLING WATER DISCHARGE

The present invention relates to submerged multiport diffusers for cooling water discharge and, more particularly, to diffusers in which the direction of discharge of the cooling water is variable as a function of the position of the discharge with respect to the longitudinal center of the diffuser as well as the half-length of the diffuser.

There accompanies herewith a copy of a technical report No. 169, authored by the present inventors and entitled "The Mechanics of Submerged Multiport Diffusers for Buoyant Discharges in Shallow Water," R. M. Parsons Laboratory for Water Resources and Hydrodynamics, March 1973. A copy of the report was deposited in the M.I.T. library system on or about June 29, 1973. The report includes exhaustive comment on all parts of the present invention, including a mathematical treatment as well as a discussion of prior art, most of which is not repeated here. Said report No. 169 is hereby incorporated herein by reference.

In managing the waste water which accrues as a result of man's domestic and industrial activities, different methods of treatment, recycling and disposal are used. The choice of a specific scheme of waste water management is determined by economic and engineering considerations, such as costs and available technology, and by considerations of environmental quality, each scheme having a certain impact on the natural environment.

In many instances the discharge of water containing heat or other degradable wastes into a natural body of water is a viable economic and engineering solution. Water quality standards have been established to regulate the adverse effects of such discharges on the receiving water. These standards are based on existing scientific knowledge of the biological, chemical and physical processes which occur in response to the waste water discharge. The standards have the objective of preserving or enhancing the use of the natural water body for a variety of human needs.

A common feature of all water quality standards, as set forth by various legal authorities, is a high dilution requirement: Within a limited mixing zone the waste water has to be thoroughly mixed with the receiving water. The purpose of this requirement is to constrain the impact of concentrated waste water to a small area.

It is against this background that the increasing use of submerged multiport diffusers as an effective device for disposal of waste water must be understood. A submerged multiport diffuser is essentially a pipeline laid on the bottom of the receiving water. The waste water is discharged in the form of round turbulent jets through ports or nozzles which are spaced along the pipeline. The resulting distribution of concentration of the discharged waste materials within the receiving water depends on a variety of physical processes. A clear understanding of these processes is needed so that predictive models can be developed which form the basis of a sound engineering design.

For several decades, many coastal cities have utilized submerged multiport diffusers for the discharge of municipal sewage water. Noteworthy aspects of these "sewage diffusers" are: (1) Water quality standards dictate dilution requirements in the order of 100 and higher when sewage water is discharged. As a consequence, these diffusers are limited to fairly deep water (more than 100 feet deep). (2) The buoyancy of the discharged water is significant. The relative density difference between sewage water and ocean water is about 2.5%.

Only in very recent years have multiport diffusers found use for the discharge of heated condenser cooling water from thermal power plants. The main impetus has come from the implementation of stringent temperature standards. Depending on the water quality classification of the receiving water and on the cooling water temperature rise, dilutions between about 5 and 20 are required within a specified mixing area. This dilution requirement frequently rules out relatively simple disposal schemes, such as discharge by means of a surface canal or a single submerged pipe. On the other hand, multiport diffusers can be placed in relatively shallow water (considerably less than 100 ft. deep) and still attain the required dilutions. The economic advantage in keeping the conveyance distance from the shoreline short might be substantial, in particular in lakes, estuaries or coastal waters with extended shallow nearshore zones. "Thermal diffusers" have these characteristics: (1) They may be located in relatively shallow water. (2) The buoyancy of the discharged water is low. Relative density differences are in the order of 0.3% corresponding to a temperature differential of about 20°F, an average value for thermal power plants.

Due to these essential differences, regarding depth of the receiving water and buoyancy of the discharge, there is a pronounced difference in the mechanics of "sewage diffusers" and "thermal diffusers." Consequently, predictive models which have been established and verified for the class of "sewage diffusers" fail to give correct predictions when applied for the class of "thermal diffusers."

In summary, submerged multiport thermal diffusers are efficient devices for the discharge into ambient water bodies of large quantities of heated cooling water primarily from electric power generation. The need for such devices stems largely from environmental considerations, which require considerable mixing of the heated water, and hence temperature reduction, in order to limit ecological damages. For typical conditions the amount of required mixing, i.e., the dilution, varies between five and twenty. Furthermore, this mixing has to be obtained within relatively small areas ranging from a few acres to several hundred acres, depending on the locality.

Accordingly, the principal object of the present invention is to provide an improved multiport diffuser for discharge into ambient water bodies of large quantities of heated cooling water from electric power generation stations and the like.

Another object is to provide a multiport diffuser of more general use.

These and still further objects are brought out hereinafter.

By way of summary, the objects of the invention are attained by a multiport diffuser having a main pipe for submerged disposition at or near the bottom of a large body of water and a plurality of nozzles oriented at an angle $\beta$ to the axis of the pipe, the angle $\beta$ being variable as function of the axial location of the particular nozzle and the half-length of the main pipe.

The invention is hereinafter described with reference to the accompanying drawing in which:

(FIG. 4-7)

Figure 4A:
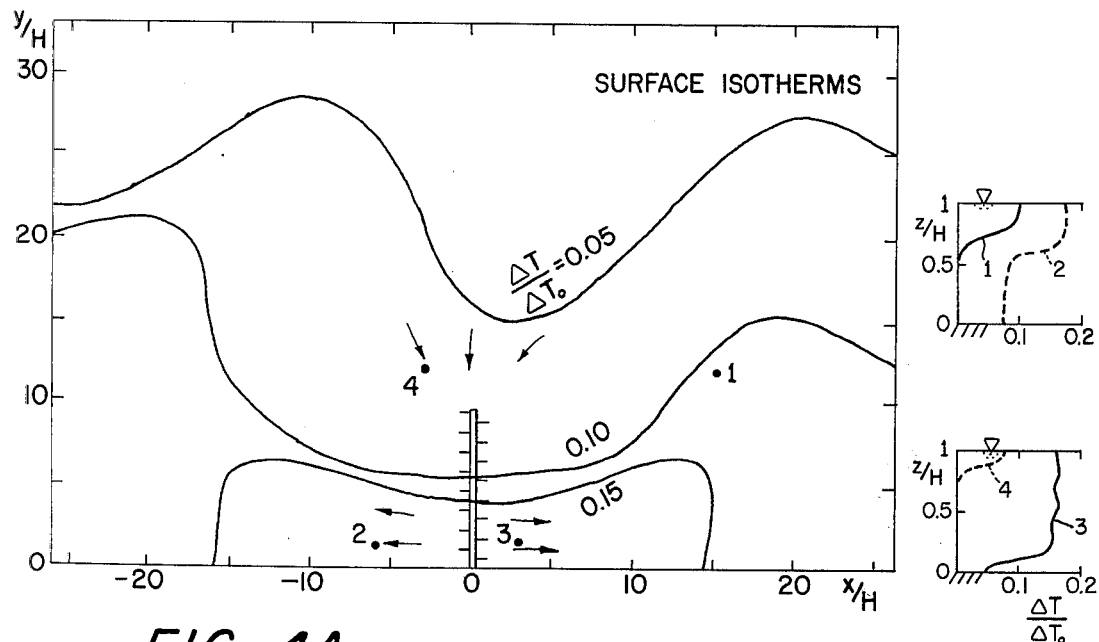
Figure 4B:
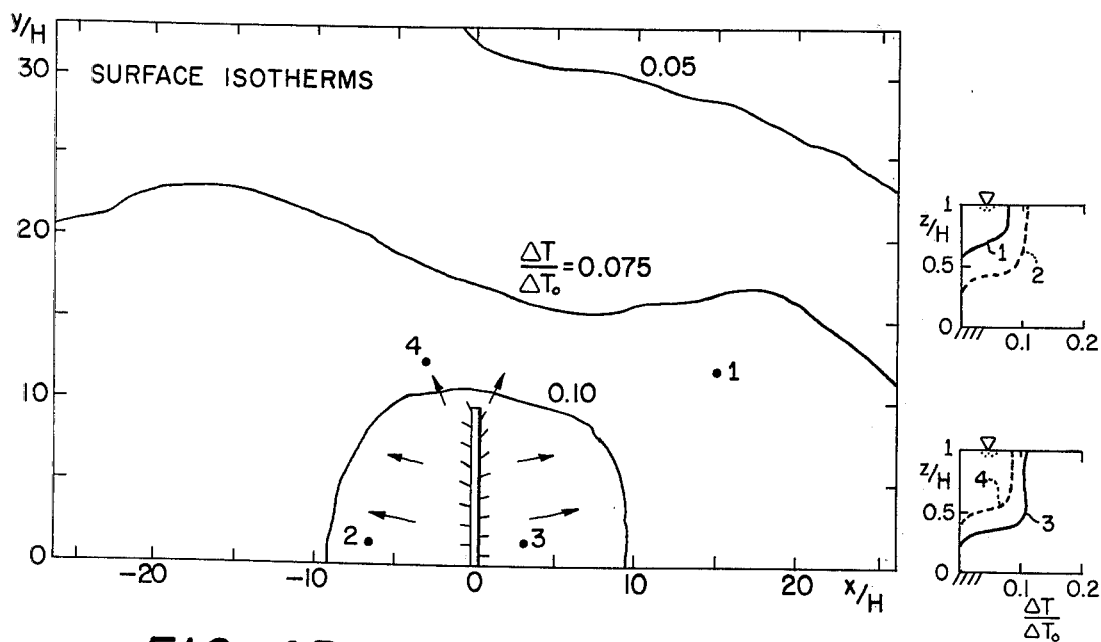
Figure 5A:
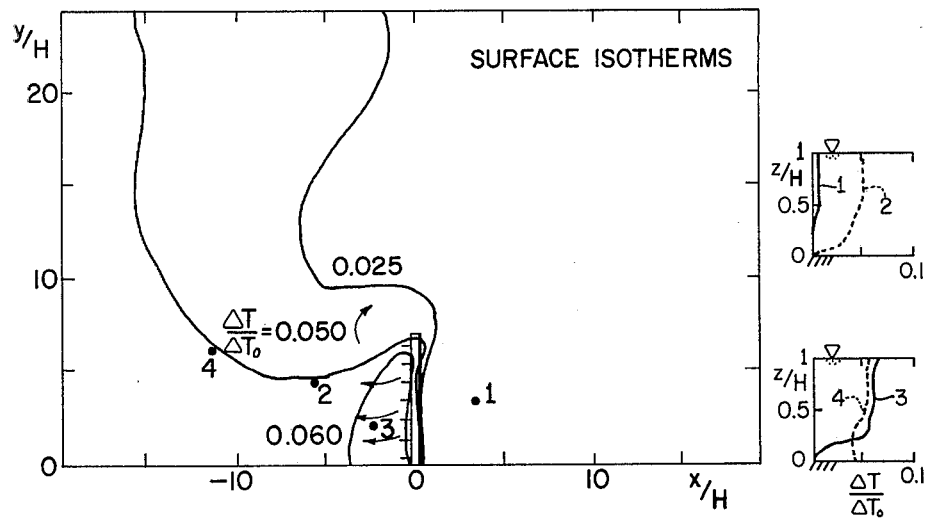
Figure 5B:
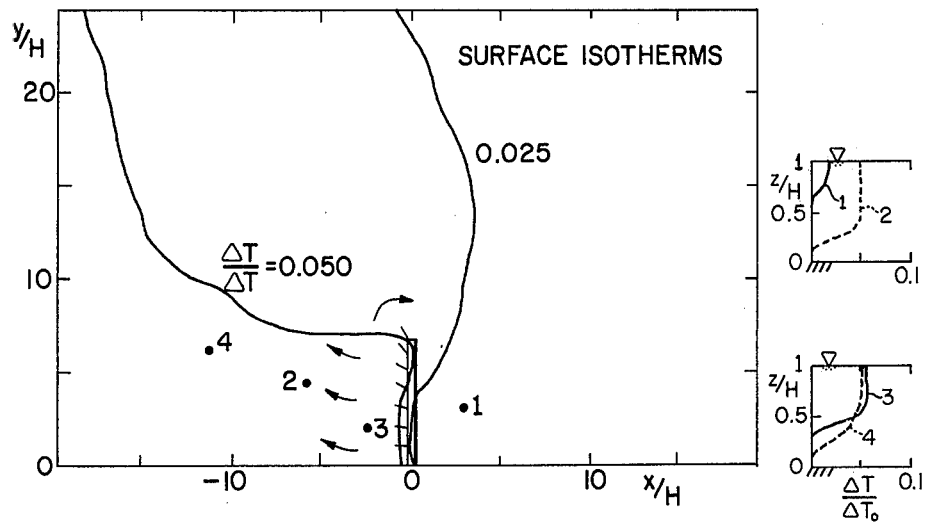

FIGS. 4A and 4B show respectively isotherms of surface temperature increases for a prior-art diffuser having alternately oriented nozzles and a diffuser of the present invention with alternately oriented nozzles, as obtained from laboratory experiments; and FIGS. 5A and 5B show respectively isotherms of surface temperature increases for a prior-art diffuser having unidirectionally oriented nozzles, as obtained from laboratory experiments.

Figure 2A:
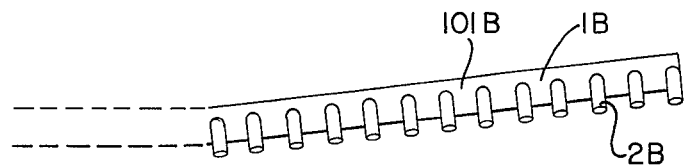
FIG. 2A is a diagrammatic plan view of a unidirectional prior art diffuser.
Figure 3A:
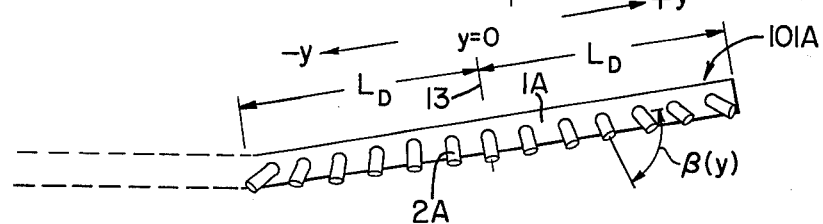
FIG. 3A is a programmatic representation similar to FIG. 2A, but showing a unidirectional diffuser of the present invention.

A brief overall explanation is now given with respect to FIGS. 2A and 3A which show respectively a small portion of a prior-art diffuser 101B and a small portion of a diffuser 101A of the present invention. The diffuser 101B comprises an elongate main pipe 1B of length $2L_D$ and has many nozzles 2B, oriented at a fixed angle $\beta=90°$ with respect to the axis of the main pipe 1B distributed along the main pipe 1B at intervals $l$. The diffusers 101A comprises an elongate main pipe 1A of length $2L_D$ and has many nozzles 2A, oriented at variable angles $\beta$ with respect to the axis of the main pipe 1A and distributed along the main pipe 1A at intervals $l$. As is shown elsewhere herein and in much greater detail in said report No. 169, the present inventors have discovered that much greater mixing of cooling water into ambient water is effected when the angle $\beta$ is variable, as now explained.

Figure 1A:
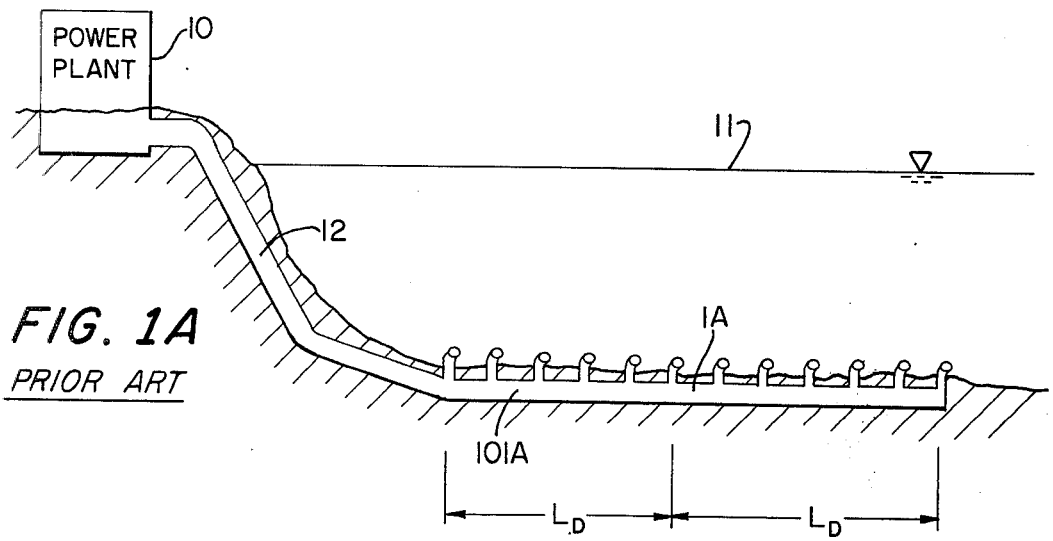
FIG. 1A is a diagrammatic side-view of a cooling system employing a multiport diffuser embodying prior art concepts.
Figure 1B:
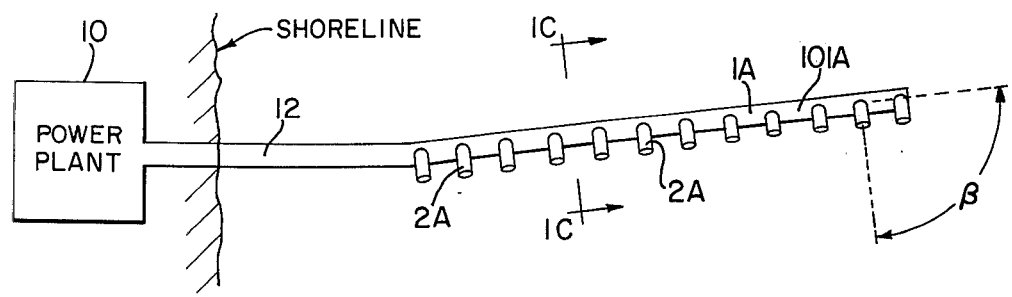
FIG. 1B is a plan view of the system of FIG. 1A.
Figure 1C:
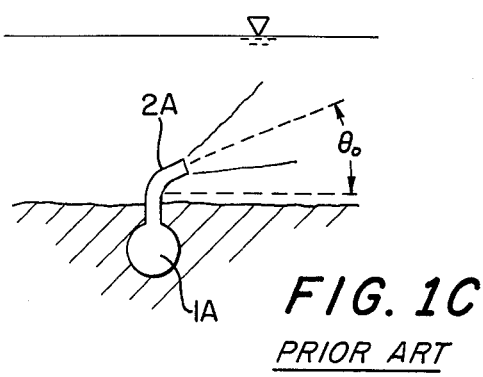
FIG. 1C is a view taken upon the line 1C—1C in FIG. 1B, looking in the direction of the arrows.
Figure 2B:
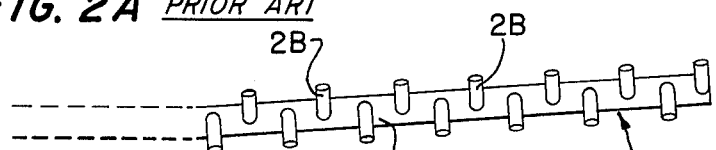
FIG. 2B is a diagrammatic plan view of an alternating direction, prior-art diffuser.
Figure 2C:
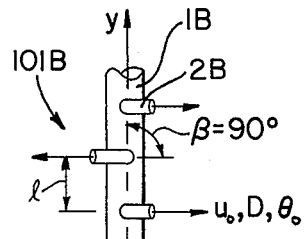
FIG. 2C is a plan view of a portion of the diffuser of FIG. 2B.
Figure 3B:
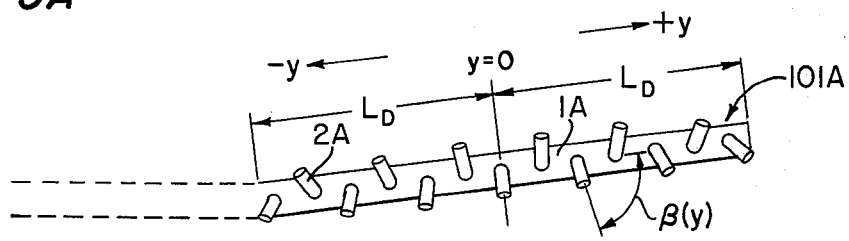
FIG. 3B is a diagrammatic representation similar to FIG. 3A, but showing an alternating-direction diffuser of the present invention.
Figure 3C:
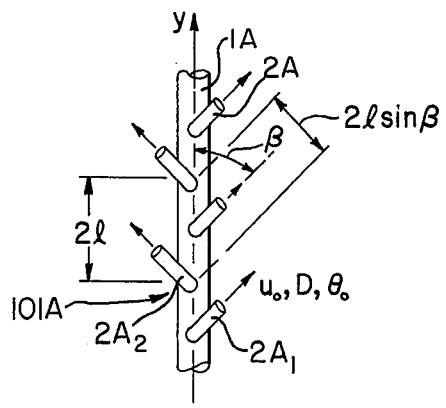
FIG. 3C is a plan view of a portion of the diffuser of FIG. 3B.

In this explanation, the label 101A applies to a diffuser of the present invention, whether the particular embodiment is unidirectional as shown in FIGS. 1, 1A, 1B, 1C, or an alternating-direction diffuser as shown in FIGS. 3A, 3B and 3C. Similar remarks apply to the prior-art system of FIGS. 2A, 2B and 2C. The terms "unidirectional" and "alternating direction" refer to the direction of orientation of the nozzles in the vertical plane; in FIG. 1C; the angle labeled $\theta_o$ is the orientation in the vertical plane. Thus, all the nozzles 2A in FIGS. 1A–1C are oriented in the vertical plane some angle $\theta_o$ from the horizontal, whereas, the nozzle labeled $2A_1$ in FIG. 3C is oriented to the right side of vertical, which might be called $+\theta_o$, and the nozzle labeled $2A_2$ is oriented to the left side of vertical, which might be called $-\theta_o$. The same applies to prior art systems. It is pointed out in the report No. 169 that there is a maximum $\theta_o$ for any system.

Characteristic technical features of a submerged diffuser installation are shown in FIGS. 1A–3A wherein a thermal power plant 10 (or any other facility with cooling water requirements) is located on the shore of a body of water 11, such as a lake, estuary or ocean. The heated cooling water is conveyed through a feeder pipe 12 to the diffuser 101A. The diffuser 101A consists of the main pipe 1A and a relatively large number of diffuser nozzles 2A spaced along the diffuser main pipe. Each diffuser nozzle has an angle, $\theta_o$, with respect to the horizontal plane and a certain horizontal orientation, $\beta$, with respect to the diffuser axis, all as above noted. The angle $\beta$ in each instance is away from a vertical line 13 drawn through the longitudinal center as shown, for example, in FIG. 3A (i.e., the inclination of the nozzles 2A to the left of the longitudinal center is toward the left and the inclination of the nozzles 2A to the right of the longitudinal center is to the right).

The horizontal orientation $\beta$ of each individual nozzle required to achieve maximum mixing capacity (dilution) with a given diffuser length is the present contribution. In the prior art, as shown in FIGS. 2A–2C, a constant horizontal orientation with respect to the diffuser axis is maintained. FIG. 2A shows a unidirectional diffuser, that is, all nozzles point to the same side of the diffuser axis; FIGS. 2B and 2C show an alternating diffuser, that is every other nozzle points into the opposite direction, as previously discussed.

The present diffuser system was obtained from a theoretical analysis and was verified in a series of experiments conducted at a scale smaller than prototype. This system consists of varying the horizontal nozzle orientation $\beta$ along the diffuser axis. The following expression describes the variable orientation:

$$\beta(y) = \cot^{-1}\left(\frac{1}{\pi}\log\frac{1 + y/L_D}{1 - y/L_D}\right),$$

wherein $y$ is the distance along the diffuser axis measured from the center point of the diffuser and $L_D$, as above indicated, is the half-length of the diffuser. This improvement holds for both the unidirectional diffusers of FIGS. 1A—1A and 3A and alternating diffusers of FIGS. 3B and 3C. The effect of the improvement can be described as follows: The variable horizontal orientation produces a fanning out of the individual jets, thus preventing contraction of the flow field downstream of the diffuser line. Improved mixing characteristics are the result. A full comparison of the mixing characteristics of the new design with those of the prior art is given in the technical report No. 169. Improvements in the mixing characteristics of up to 30% have been found as now discussed with reference to FIGS. 4A, 4B, 5A and 5B.

FIGS. 4A and 4B give a comparison between the prior art and the present syste, respectively, for an alternating diffuser design. These comparisons are obtained from laboratory experiments performed in a model basin. Surface isotherms show the normalized temperature rise above ambient, in addition four vertical temperature profiles in the model basin are shown. The x-axis at the bottom of each diagram may be considered as the symmetry line of the diffuser. The present system shows about 30% lower induced temperature rises at the surface of the body of water in the vicinity of the diffuser as compared to the prior art, FIG. 4A. FIGS. 5A and 5B give the comparison for a unidirectional diffuser of the prior art and the present invention, respectively. FIG. 5B shows about 10% lower induced temperature rises as compared to the prior art as represented in FIG. 5B.

Improved mixing characteristics mean that for a given cooling water discharge (flow rate and temperature differential) the diffuser structure can be shorter while still meeting required temperature reductions (environmental regulations). Cooling water outfalls from modern large-size electric power plants are large and expensive installations. For a typical 1000 MW nuclear power plant, the length of the diffuser pipe may be up to 5000 feet and more. Costs of pipe installations are high, varying from about $500/ft. to several $1000/ft. depending on pipe size and site conditions. Therefore, if due to mixing characteristics, improved by 10% to 30%, the diffuser length can be reduced proportionally, cost savings of up to several million dollars can be experienced in any single diffuser installation.

Modifications of the invention herein described will occur to persons skilled in the art and all such modifications are deemed to be within the spirit and scope of the invention as defined by the appended claims.

What is claimed is:

1. A multiport diffuser for cooling water discharge that comprises:

an elongate main pipe and a large number of discharge nozzles oriented at variable angle equal to or substantially equal to $\beta(y)$ with respect to the pipe axis, wherein $$\beta(y) = \cot^{-1} \left( \frac{1}{\pi} \log \frac{1 + y/L_D}{1 - y/L_D} \right),$$

wherein $y$ is the distance along the pipe from the longitudinal center of the diffuser pipe, and $l_D$ is the half-length of the diffuser.

2. A multiport diffuser as claimed in claim 1 in which the nozzles on either side of said longitudinal center are inclined away from a line through said longitudinal center and orthogonal to said axis.

3. A multiport diffuser as claimed in claim 2 in which the discharge nozzles are oriented alternately to one said and the other of the diffuser in an alternating discharge mode.

4. A multiport diffuser as claimed in claim 2 in which the discharge nozzles are oriented toward one side of the diffuser in unidirectional discharge mode.

5. A method of diffusing buoyant fluids, such as cooling water, sewage effluents and the like, into a large body of fluid and adapted to maximize diffusion of the discharged fluid into the ambient fluid that comprises: moving the discharge fluid along a flow duct at the bottom of the large body of fluid; discharging the buoyant fluid at a large number of locations along said flow duct, the direction of discharge of the buoyant fluid being a variable angle equal to or substantially equal to $\beta(y)$ with respect to the orientation of the flow duct, wherein $$\beta(y) = \cot^{-1} \left( \frac{1}{\pi} \log \frac{1 + y/L_D}{1 - y/L_D} \right),$$

and wherein $y$ is the distance in either direction along said flow duct measured from the center of the discharge region and $L_D$ is the half length of the discharge region.

* * * * *